United States Patent [19]

Beyrouty

[11] Patent Number: 5,421,281
[45] Date of Patent: Jun. 6, 1995

[54] PILLOWS ADAPTED FOR USE ON BOARD OIL SPILL SYSTEM FOR OIL CARRYING TANKER

[75] Inventor: Louis Beyrouty, Ewing, N.J.

[73] Assignee: Oscar Systems Inc., Trenton, N.Y.

[21] Appl. No.: 111,426

[22] Filed: Aug. 25, 1993

[51] Int. Cl.$^6$ ............................................. B63B 43/16
[52] U.S. Cl. .................................. 114/228; 114/74 R;
114/227; 210/484; 210/680; 210/693; 210/924;
428/304.4; 428/308.4; 428/321.1
[58] Field of Search ................... 114/74 R, 227, 228;
210/484, 680, 693, 924; 427/243, 244;
428/304.4, 308.4, 318.6, 319.3, 319.7, 319.9,
321.1

[56] References Cited

U.S. PATENT DOCUMENTS

| 3,681,237 | 8/1972 | Orban et al. | 210/680 |
| 4,981,097 | 6/1991 | Beyrouty | 114/228 |
| 5,200,083 | 4/1993 | Kaylor | 210/671 |

*Primary Examiner*—D. S. Nakarani

[57] ABSTRACT

An open celled plastic foam treated with a polymer which is adsorbed in the surface of the foam and causes the polymer adsorbed foam to become an oil wick and to be impervious to water. The polymer adsorbed foam when the cells of the foam are saturated with oil exhibiting a density heavier than oil and lighter than water.

2 Claims, No Drawings

PILLOWS ADAPTED FOR USE ON BOARD OIL SPILL SYSTEM FOR OIL CARRYING TANKER

This invention is directed toward pillows for use in a system for minimizing the amount of oil spilled from an oil holding tank in an oil carrying vessel, such as an oil carrying tanker, when the vessel is in the water and the tank is ruptured, causing an oil leak.

BACKGROUND OF THE INVENTION

U.S. Pat. No. 4,981,097 discloses a system for closing an oil leaking rupture from an oil holding tank disposed in an oil carrying vessel disposed in water. This system includes a pillow storage container which is fixedly secured to the vessel above a hole in the deck of the vessel which overlies the tank and communicates therewith. The container has a releasably disposed floor disposed in the hole above the tank. The container can be pressurized and releasably contains a plurality of oil absorbent pillows. When the tank is ruptured, the floor of the container is automatically opened and the pillows fall by gravity into the tank. On board means are provided to collect any pillows which escape through the rupture into the water surrounding the vessel.

Subsequent to the issuance of U.S. Pat. No. 4,981,097, applicant conducted a series of experiments with this system. Applicant discovered, much to his surprise, that the pillows described in this known system will not function efficiently unless, as explained below, these pillows, in addition to being oil adsorbent and impervious to water, must have a density heavier than oil and lighter than water.

SUMMARY OF THE INVENTION

Accordingly, it is an object of the present invention to provide new and improved pillows which are oil adsorbent, impervious to water and are characterized by a density heavier than oil and lighter than water.

Another object is to provide new and improved pillows of the character indicated.

Still another object is to provide a new and improved method for producing pillows of the character indicated.

Yet another object is to provide a new and improved method of the character indicated wherein the pillow material is initially absorbent both to oil and water and thereafter is processed to adsorb oil very rapidly and to be impervious to water.

A further object is to provide a new and improved method for compressing pillows prior to use as well as new and improved pillows resulting from use of this method and used in the manner indicated.

Still a further object is to provide a new and improved pillow of the character indicated which is initially compressed and absorbs oil very rapidly and expands enormously when immersed in an oil holding tank after the tank is ruptured.

These and other objects will either be explained or will become apparent hereinafter.

In order to explain why pillows which are oil absorbent and water repellant must also exhibit a density larger than that of oil and smaller than that of water, it is necessary to observe the use of the pillows when an oil holding tank contained in an oil tanker is ruptured while the tanker is at sea.

Whenever a rupture occurs, oil begins to leak out into the surrounding water, and because oil has a lower density than water, the oil begins to move upward in the water toward the surface thereof. As the oil leaks outward, water begins to enter the tank via the rupture.

If the rupture is disposed at the bottom of the tank, and the pillows are less dense than the oil, the pillows will not fall through the oil to reach the rupture and the rupture will not be sealed. However if the pillows are denser than the water, the pillows will fall to the bottom, but since there is always some space between some of the pillows, the water, being less dense than the pillows, will flow upward and continue displacing the oil, which consequently will flow downwardly and continue to flow out of the tank.

When the rupture is located above the bottom of the tank, and the pillow density is lighter than the oil density, the pillows will tend to float on the oil, and the rupture will not be sealed. If the pillows are denser than water, they will fall downward past the rupture and will not seal it off whereby the leak will continue.

However, when the pillows have a density larger than that of oil and smaller than that of water, some of the pillows will be entrained in the flow of oil to the rupture and will be caught and positioned within the rupture, slowing the rate of oil discharge, while other pillows will be positioned at the oil-water interface, creating a blanket which forms a barrier which further slows the discharge of oil.

The pillows, to be oil absorbent, must contain a solid material which is oil absorbent. As will be explained below, the preferred material, which is an open celled plastic foam, is initially both oil absorbent and water absorbant. The material from which the foam is produced has a density which is normally greater than water, but since the open cells are initially filled with air, the foam has an initial composite density less than oil.

Applicant has found by experiment that treating this raw foam with a polymer which exhibits the dual proporties of promoting rapid oil adsorption and at the same time preventing water adsorption, the polymer is adsorbed onto the foam fibers and acts like an oil wick. As soon as the polymer containing foam is placed in oil, the oil is rapidly absorbed, and replaces the air in the open cells, and the pillow becomes fully saturated with oil very quickly. The pillow clings to oil like a magnet, drawing it in and interacting with the oil molecules to hold them tightly together. The fibers in the pillow do not absorb oil into the fiber; the oil is adsorbed onto the fiber. The oil saturated polymer containing foam then has a composite density heavier than oil and lighter than water and is used in the manner taught herein.

After the pillow has so adsorbed oil and then is removed from the tank, the adsorped oil can be recovered by compressing or squeezing the pillow until all oil is expelled. There are certain advantages in compressing the pillow prior to use since the compressed pillow can be reused immediately after the oil is expelled.

DETAILED DESCRIPTION OF PREFERRED EMBODIMENTS

The starting material are either polyurethane or polyethylene foam in the form of open celled untreated fibers. These materials will absorb many different types of liquids, including both oil and water. The density of the starting material, either polyurethane or polyethelene foam, is less than the density of water, but the open cell foam has these open cells filled with air. The composite density of the open cell foam is lighter than oil.

Surprisingly, when the material is treated by coating the foam fibers with a polymer known to chemists as PIB [poly-iso-butylene], this polymer renders the material very highly and quickly oil adsorbent and at the same time makes the polymer treated open cell foam impervious to water.

The method used is to use PIB as a thin solution having the approximate consistence of water. The material is drawn through a bath of the solution through rollers which squeeze out excess PIB. The material can then be allowed to dry in air or can be oven dried. It is then cut or shaped into pillow form.

The treated pillow is placed in oil. While initially, the density of the foam is less than oil, the oil is rapidly wicked into the pillow, filling the open cells with oil and saturating the pillow. The oil displaces the air in the cells. The composite density of the pillow saturated with oil is heavier than oil and lighter than water.

The size and shape of the pillows will depend both upon the geometry of the oil holding tank and the geometry of the pillow container. As a general rule, the pillows will vary in size and shape so that any restriction in the tank will not block the passage of the pillows. The total volume of the pillows employed, typically can be about 15 percent of the total volume of the tank.

Use of compressed pillows in preferably fully compressed minimum volume form is clearly advantageous, both from the standpoint of obtaining maximum usable volume of oil expanded pillows with a minimum of fully compressed pillows stored in the pillow container and also from recovering the oil from oil expanded pillows after removal from the oil and then compressing same for further use. A conventional garbage type compactor can be used for compressing the pillows to express the oil which can then be recovered for future use.

While the invention has been described with reference to the detailed description, the protection solicited is to be limited only by the claims which follow.

What is claimed is:

1. In combination with an oil carrying vessel at sea, the vessel having an oil holding tank which is ruptured so that oil leaks out of the tank into the sea and water from the sea leaks into the tank, thereby forming an oil-water interface in the tank, a plurality of pillows, each pillow formed of open celled polyurethane or polyethylene fibers, said fibers are coated with a water repellent, each pillow being saturated with oil and having a composite density heavier than oil and lighter than water, said pillows being disposed at the interface and constituting an oil leakage barrier.

2. The combination of claim 1, wherein said water repellent is a polyisobutylene.

* * * * *